United States Patent [19]
Nemoto et al.

[11] Patent Number: 5,838,726
[45] Date of Patent: Nov. 17, 1998

[54] METHOD OF AUTOMATICALLY ADJUSTING THE OUTPUT VOLTAGE IN A TRANSMISSION SYSTEM

[75] Inventors: Kenji Nemoto; Tsudoi Kubo, both of Kawasaki, Japan

[73] Assignee: Fujitsu Limited, Kanagawa, Japan

[21] Appl. No.: 673,267

[22] Filed: Jun. 28, 1996

[30] Foreign Application Priority Data

Jun. 29, 1995 [JP] Japan .................................. 7-163318

[51] Int. Cl.$^6$ .............................. H04B 3/00; H04L 25/00
[52] U.S. Cl. ......................... 375/257; 375/259; 333/17.1
[58] Field of Search ................................... 375/257, 219, 375/221, 259, 295, 317, 316, 345; 455/69, 3.1; 359/180, 154, 187, 189; 333/17.1; 370/249, 252

[56] References Cited

U.S. PATENT DOCUMENTS

4,151,490  4/1979  Bazin ........................................ 333/16
4,392,225  7/1983  Wortmann ................................ 370/492
5,345,592  9/1994  Woodmas .................................. 455/3.3

*Primary Examiner*—Stephen Chin
*Assistant Examiner*—Betsy L. Deppe
*Attorney, Agent, or Firm*—Helfgott & Karas, P C.

[57] ABSTRACT

A method is provided for automatically adjusting the output signal level from a transmitting apparatus, in which the transmitting apparatus recognizes the distance to a receiving apparatus and automatically adjusts the signal output level. In a system in which a signal is transmitted from a transmitting apparatus via a coaxial cable to a receiving apparatus, the signal output from the transmitting apparatus is gradually changed, a judgment being made as to whether or not reception of the signal is possible at the receiving apparatus. When this condition is achieved, notification of the condition is made to the transmitting apparatus which when receiving this notification, sets the signal level to the signal level at that time, thereby setting the signal level to the level which is the receiving limit at the receiving apparatus. Thus the signal output level of the transmitting apparatus is set to a signal output level that corresponds to the length of the coaxial cable between the transmitting apparatus and the receiving apparatus.

5 Claims, 9 Drawing Sheets

METHOD OF AUTOMATICALLY ADJUSTING THE OUTPUT VOLTAGE IN A TRANSMISSION SYSTEM

BACKGROUND OF THE INVENTION

1. Field of the Invention

The present invention relates to a method for automatically adjusting the output signal level from a transmitting apparatus, and more particularly to a method for automatically adjusting the signal output level in which the transmitting apparatus senses the distance to the receiving far-end apparatus.

2. Description of Related Art

In the DS3 interface, a coaxial cable transmission system widely used in the North American region, a multiplexed signal of, for example, 44.736 MHz, which is branched off an optical trunk line, is transmitted over a relatively short distance using a metallic coaxial cable.

In the method of adjusting the output signal level (Line Build Out: LBO) used in the DS3 interface, the transmitting apparatus must be able to recognize the distance to the far-end apparatus and automatically adjust the LBO. Furthermore, typical methods of adjusting the signal level on the line between the two opposing apparatuses include the method of holding the output level fixed and performing amplification at the receiving end, and the method of adjusting the signal level at the output side to adjust the output. The present invention uses the latter of these two methods.

In the DS3 interface, a typical method of defining the specifications with regard to a signal output to the line is that of pulse shape (or a pulse mask).

An example of a pulse shape specification is set forth in a specification (TR-NWT-00499) by Bellcore of North America, the normalized amplitude of 1 corresponding to 0.36 to 0.85 volts.

A signal transmitted on a metallic coaxial cable is subject to transmission loss introduced by the cable. In the metallic coaxial cable used in North America, the distance for connection without a repeater is set as a cable length of 450 feet (135 meters). Therefore, even if the other apparatus is located within 450 feet, in order to satisfy the above recommendation, it is necessary to output the signal at a level corresponding to the distance to the opposing apparatus.

In such a case, because the above-noted recommendation allows some degree of margin, a common method that is applied is that of dividing the 450 feet into a number of regions, the signal output level being adjusted beforehand for the expected distance.

In the previous LBO adjustment method for the DS3 interface, the signal output level was set to correspond to a number of distance steps required to reach the other apparatus. In this case, because the distance to the other apparatus is known, is was sufficient to set the LBO in accordance with that value. For example, in setting the signal output level by means of a hardware switch, the switch is set (changed) by a human, and in a case in which it is possible to make a setting using software, a maintenance command or the like can be used to make the setting (change).

However, in the case of a change in the opposing apparatus and when performing testing, it is inefficient to have to make a manual setting of the LBO each time, making it desirable to be able to perform automatic LBO setting. A method of automatically setting the LBO is useful even as a method of checking the distance to the opposing apparatus. However, there has been absolutely no such automatic LBO adjustment method proposed in the past.

SUMMARY OF THE INVENTION

In consideration of the above-noted drawbacks in the prior art, an object of the present invention is to provide a method for automatically adjusting the output voltage level of a signal on a line in a transmitting apparatus.

According to the present invention, a method for automatically adjusting the output voltage level of a signal on a line in a transmitting apparatus is provided for use in a transmitting apparatus which transmits a signal via a coaxial cable between it and an opposing apparatus, wherein the transmitting apparatus, by setting the output level of the signal in this transmitting apparatus to the limit of reception at the receiving apparatus, automatically adjusts the signal output level from the transmitting apparatus in response to the length of the coaxial cable between the transmitting apparatus and the receiving apparatus.

The above-noted automatic adjustment of the signal output voltage is performed by starting at the output level corresponding to a coaxial cable length of zero and increasing the output level to levels which correspond to successively increased coaxial cable lengths.

The judgment of the reception limit at the above-noted receiving apparatus is performed based on ability of bipolar/unipolar conversion of the received signal at the above-noted opposing apparatus.

In the above-noted automatic output voltage adjustment method in the above-noted transmitting apparatus, the condition of whether or not bipolar/unipolar conversion of the received signal is possible at the receiving apparatus is passed to the transmitting apparatus by using the yellow alarm in the DS3 frame format.

In the above-noted automatic output voltage adjustment method in the above-noted transmitting apparatus of the present invention, loopback specification is performed from the transmitting apparatus by means of the FEAC (far end alarm control) code word in the DS3 format, and by having the receiving apparatus loopback the input signal based on this code word, and the condition of whether or not bipolar/unipolar conversion is possible at the receiving apparatus is passed to the transmitting apparatus.

In the above-noted automatic output voltage adjustment method in the above-noted transmitting apparatus of the present invention, when the input signal is looped-back by the loopback from the transmitting apparatus by means of the FEAC code word, by inserting a special code in the payload of the looped-back DS3 frame format, it is possible to recognize from the transmitting apparatus that its output signal has been looped-back.

BRIEF DESCRIPTION OF THE DRAWINGS

The present invention will be more clearly understood from the description as set forth below, with reference being made to the accompanying drawings, wherein.

DESCRIPTION OF PREFERRED EMBODIMENTS

Before describing the present invention, the technology related to the present invention will be described.

Figure 1:
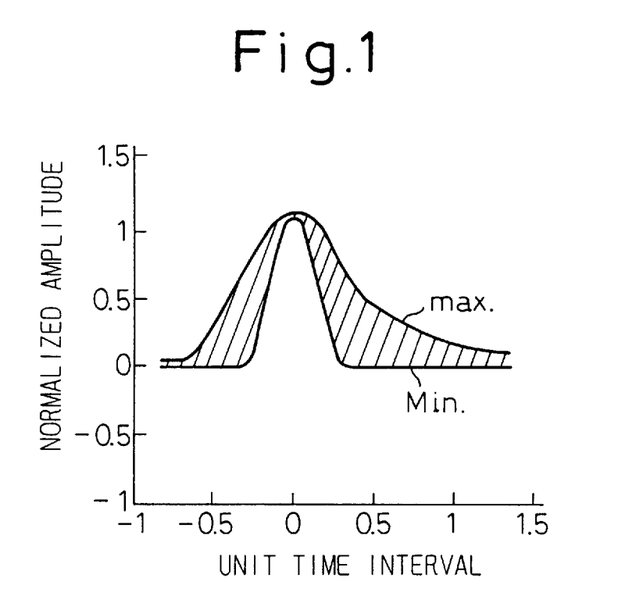
FIG. 1 is a drawing which shows an example of a pulse-shape specification.

FIG. 1 shows an example of a pulse-shape specification, this specification being the one set forth in the North America Bellcore specification (TR-NWT-000499). In this figure, the normalized amplitude corresponds to the range 0.36 to 0.85 volts.

A signal transmitted on a metallic coaxial cable is subject to transmission loss introduced by the cable. In the metallic coaxial cable used in North America, the distance for connection without a repeater is set to a cable length of 450 feet (135 meters). Therefore, even if the other apparatus is located within 450 feet, in order to satisfy the recommendation shown in FIG. 1, it is necessary to output the signal at a level corresponding to the distance to the receiving apparatus.

In such a case, because the above-noted recommendation allows some degree of margin, a common method that is applied is that of dividing the 450 feet into a number of regions, the signal output level being adjusted beforehand for the expected distance.

Figure 2:
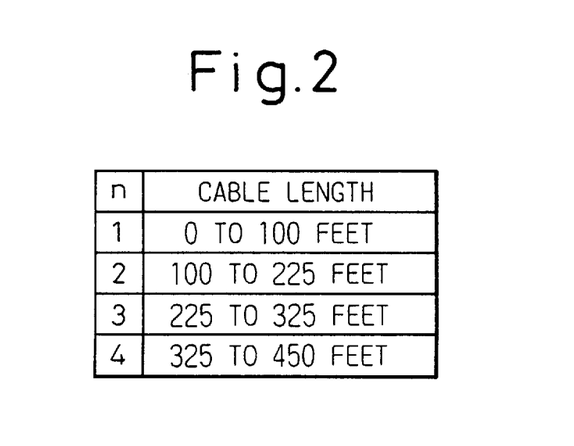
FIG. 2 is a drawing which shows an example of an LBO setting in a DS3 interface apparatus of the past.
Figure 3:
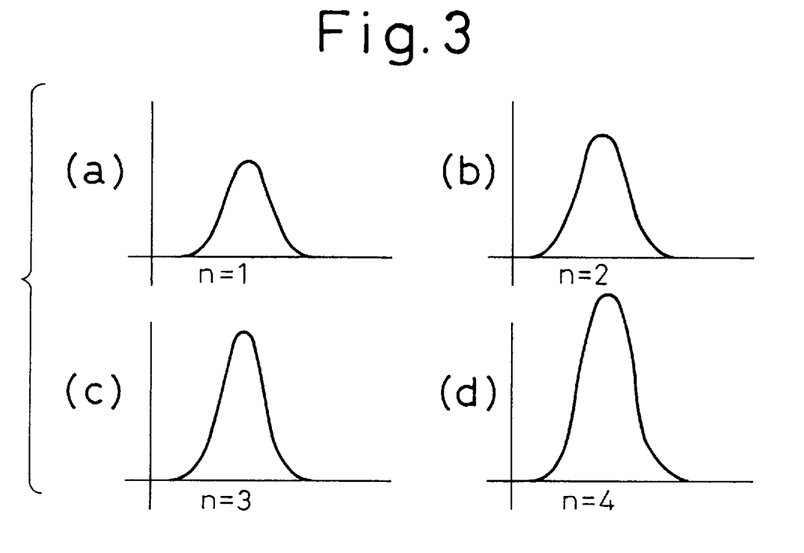
FIG. 3 is a drawing which shows a pulse image at the time of each LBO setting.

FIG. 2 shows and example of the previous LBO adjustment method in the DS3 interface, the distance being divided into n steps, where n=4 in this example. FIG. 3 shows pulse images for each of the LBO settings, this showing the output signal waveform image for each of the settings in the case of division by n, where n=4.

In the LBO adjustment method in the DS3 interface in the past, the signal output level was set in accordance with the stepwise divided distances. In this case, because the distance to the other apparatus is known, it was sufficient to set the LBO in accordance with that value. For example, in setting the signal output level by means of a hardware switch, the switch is set (changed) by a human, and in a case in which it is possible to make a setting using software, a maintenance command or the like can be used to make the setting (change).

The present invention will next be described.

Figure 4:
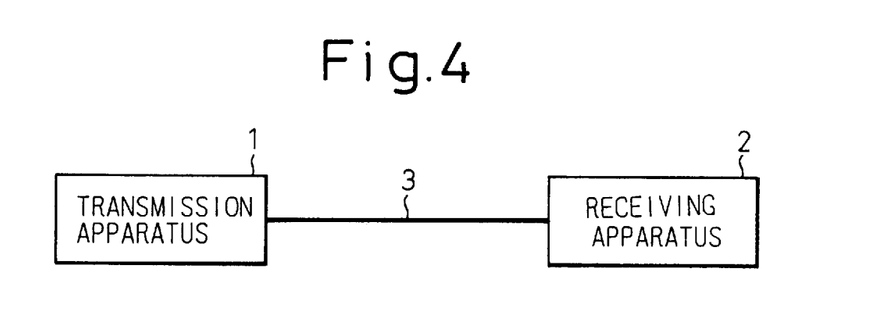
FIG. 4 is a drawing which shows the conceptual configuration of the present invention.

FIG. 4 shows the conceptual configuration of the present invention. In the present invention, the following means are provided to achieve the above-noted object.

(1) In a transmitting apparatus 1 which transmits a signal to a receiving apparatus 2 via a coaxial cable, the signal output level at the transmitting apparatus 1 is set to limit of reception at the receiving apparatus 2, so that the signal output level of the transmitting apparatus 1 is automatically adjusted in response to the coaxial cable length between the two apparatuses.

More specifically, in a system in which a signal is transmitted to a receiving apparatus 2 from a transmitting apparatus 1 via a coaxial cable 3, the signal level output from the transmitting apparatus 1 is gradually changed, a judgment being made as to whether or not the received signal level at the receiving apparatus 2 is a receivable level, and if the judgment is made that the received level is a receivable level, this condition is passed to the transmitting apparatus 1. When the transmitting apparatus 1 receives this notification, the signal level is set to the level for that condition, thereby making the output signal level at the transmitting apparatus 1 the reception limit level at the receiving apparatus 2, which automatically adjusts the signal output level in response to the coaxial cable length between the transmitting apparatus 1 and the receiving apparatus 2.

(2) In the case described in (1), the automatic signal level adjustment is started from the output level corresponding to a coaxial cable length of zero, and is increased to levels which correspond to successively longer lengths of coaxial cable.

(3) In the case described in (1), the judgment of the signal reception limit at the receiving apparatus 2 is made based on whether or not bipolar/unipolar conversion can be performed on the received signal at the receiving apparatus 2.

(4) In the case described in (3), the condition of whether or not bipolar/unipolar conversion can be performed at the receiving apparatus 2 is passed to the transmitting apparatus 1 using the yellow alarm of the DS3 frame format.

(5) In the case described in (3), loopback specification is performed by the transmitting apparatus 1 by means of an FEAC code word in the DS3 format, the receiving apparatus 2 looping-back the input signal in accordance with this code word, thereby notifying the transmitting apparatus 1 that bipolar/unipolar conversion was possible at the receiving apparatus 2.

(6) In the case described in (5), when the input signal is looped back based on the loopback specification from the transmitting apparatus 1 by means of the FEAC code word, a special code is inserted into the DS3 frame payload which is looped back, thereby enabling the recognition at the transmitting apparatus 1 that its own output signal has been looped back.

In the DS3 interface, even if the signal level on the line does not satisfy the recommendation as shown in FIG. 1, this will not necessarily exhibit a one-to-one correspondence with the generation of a bit error. That is, even if the LBO setting is different than that which corresponds to the distance to the opposing apparatus, a bit error will not necessarily occur. For example, near the boundaries between the distance regions in the LBO setting (near 230 feet in FIG. 2), a bit error will not occur at the LBO settings corresponding to the region either before or after the boundary.

This is because a signal output by a setting for the region either before or after the boundary is sufficient to exceed the recognition threshold value of the hardware at the receiving side. In this type of erroneous LBO setting, the only problem is simply that of not satisfying the specifications. Therefore, in the case in which the LBO setting is different from the actual distance, in order to recognize the distance to the opposing apparatus, it is sufficient to output a signal level at the hardware recognizable limit at the receiving side.

In the present invention, in consideration of the above-noted point, automatic LBO adjustment is performed so that only in the case in which the LBO setting is matched to the actual distance is the signal level output so that it is possible to perform bipolar/unipolar (hereinafter referred to as B/U) conversion at the receiving side.

Figure 5:
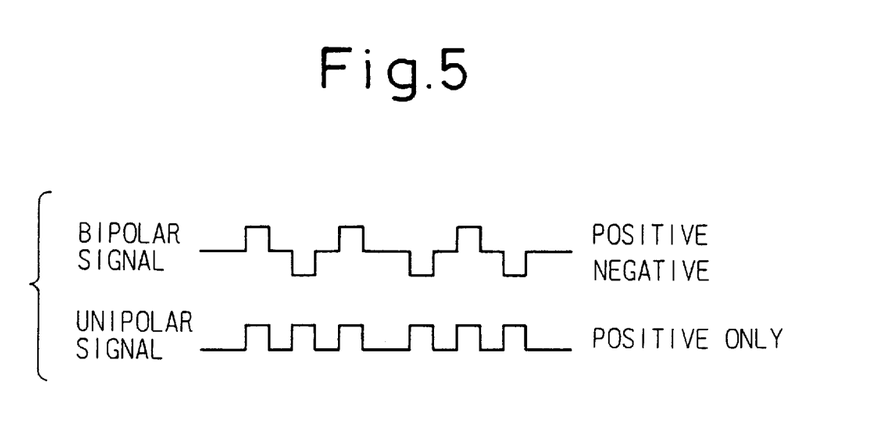
FIG. 5 is a drawing which shows an example of bipolar/unipolar conversion.

FIG. 5 shows an example of B/U conversion, this drawing showing a bipolar signal having both positive and negative parts, and a unipolar signal converted therefrom which has only positive levels.

The present invention will next be described in terms of the procedure followed therein.

[1] Assume that there are n different LBO settings, with n=1, 2, . . . , n, and with n=1 corresponding to a distance which includes the shortest distance and increasing as the distance increases. For example, in the above-noted FIG. 2, for n=1, the distance is the range 100 feet to 225 feet.

The attenuation factor of the metallic coaxial cable is k, where the value of k, for example in North America, is approximately 5.3/450 dB/feet. The shortest distance to the opposing apparatus at each value of n set by the LBO is $l_n$. For example, in FIG. 2, $l_2$=100 feet. Therefore, the attenuation $k_n$ at a distance of $l_n$ is given as follows.

$$k_n = l_n \times k \text{ dB}$$

For example, in the above-noted FIG. 2, $k_2$=5.3/450*100 dB.

If the voltage level of the output signal pulse for each value of n is $v_n$ volts, from the definition of the attenuation ($k_n$=20 $\log_{10}$ ($v_o/v_n$), the voltage level $v_n$ of the signal at the distance point $l_n$ is as follows.

$$v_n = v_o/10^{(ln*k/20)}$$
$$= f(l_n)*v_2$$

For example, in the above-noted FIG. 2, we would have the following.

$$v_2 = v_o/10^{(100*5.3/450/20)}$$

The voltage level of a signal at a point at the distance $l_n$ is the product of a function of the voltage $v_o$ and a function of the distance $l_n$. If the B/U conversion threshold value is $v_{bu}$ volts, we have the following.

$$f(l_n)*v_o > v_{bu} > f(l_{n+1})*v_o \quad (1)$$

If the voltage $v_o$ is output at successively increasing values starting at the smaller value of n, when the value of n is smaller than the value which matches the actual distance, it is not possible to perform B/U conversion at the receiving side. When the value of n is one value before the value which matches the actual distance, from the relationship of the right side of inequality given at (1), it is not possible to perform B/U conversion.

However, when the value of n reaches a value which matches the actual distance, it becomes possible to perform B/U conversion at the receiving side. In this condition, the voltage value of $v_{bu}$ can be set by a processor.

Figure 6:
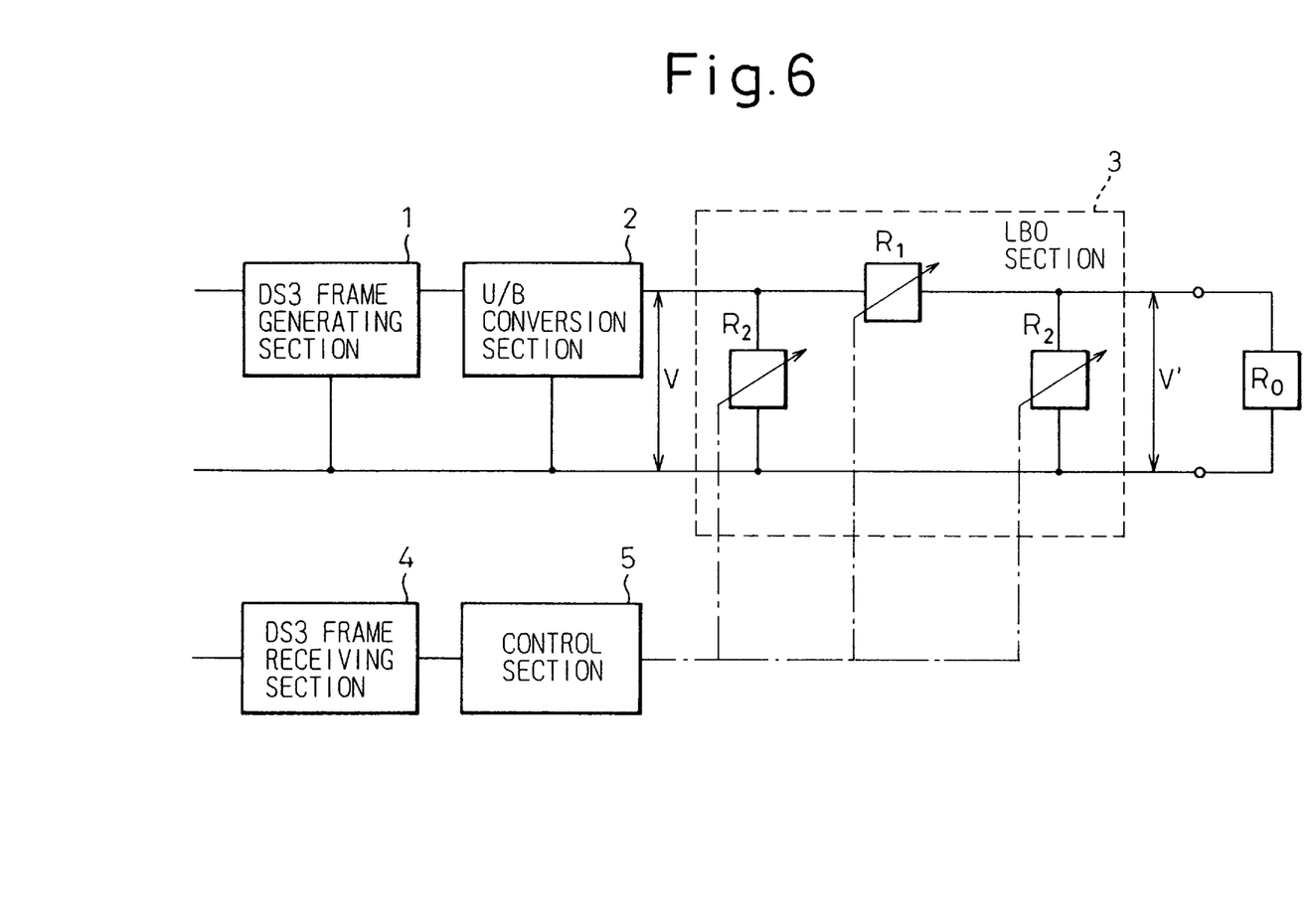
FIG. 6 is a drawing which shows an embodiment of an automatic voltage adjusting circuit according to the present invention.

FIG. 6 shows an output voltage adjusting circuit of an embodiment of the present invention, which is an example of a circuit configuration for adjusting the output voltage level $v_0$ of the output signal pulses.

In this drawing, the reference numeral 1 denotes the DS3 frame generating section, which generates a frame from a unipolar signal in a format set forth by the DS3 interface specifications, 2 is a U/B conversion section, which converts a frame which is generated by the DS3 frame generating section from a unipolar signal to a bipolar signal, and 3 is the LBO section, which has a π-configured circuit and which attenuates the output voltage v from the U/B conversion section 2 and converts it to v', thereby generating the output signal.

In the same drawing, 4 is a DS3 frame receiving section, which receives a DS3 frame of the received signal from the opposing apparatus, and which outputs a signal for output voltage adjustment, and 5 is a control section which, based on the output signal from the DS3 frame receiving section 4, causes the values of the resistances $R_1$ and $R_2$ of the π-configured circuit in the LBO section 3 thereby adjusting the amount of attenuation thereof.

The output voltage v' depends upon the values of the resistances $R_1$ and $R_2$ of the π-configured circuit, and of the load resistance $R_0$ according to the following equation.

$$v' = \frac{R_0 R_2/(R_0 + R_2)}{R_1 + \{R_0 R_2/(R_0 + R_2)\}} \text{ V}$$

[2] The above-noted value n which matches the actual distance from the transmitting apparatus to the receiving apparatus can be recognized by either of the following two methods.

<1> The method of using the yellow alarm, which is a remote alarm

<2> The method of using FEAC (Far End Alarm Control)

These two methods will be described next.

Figure 7:
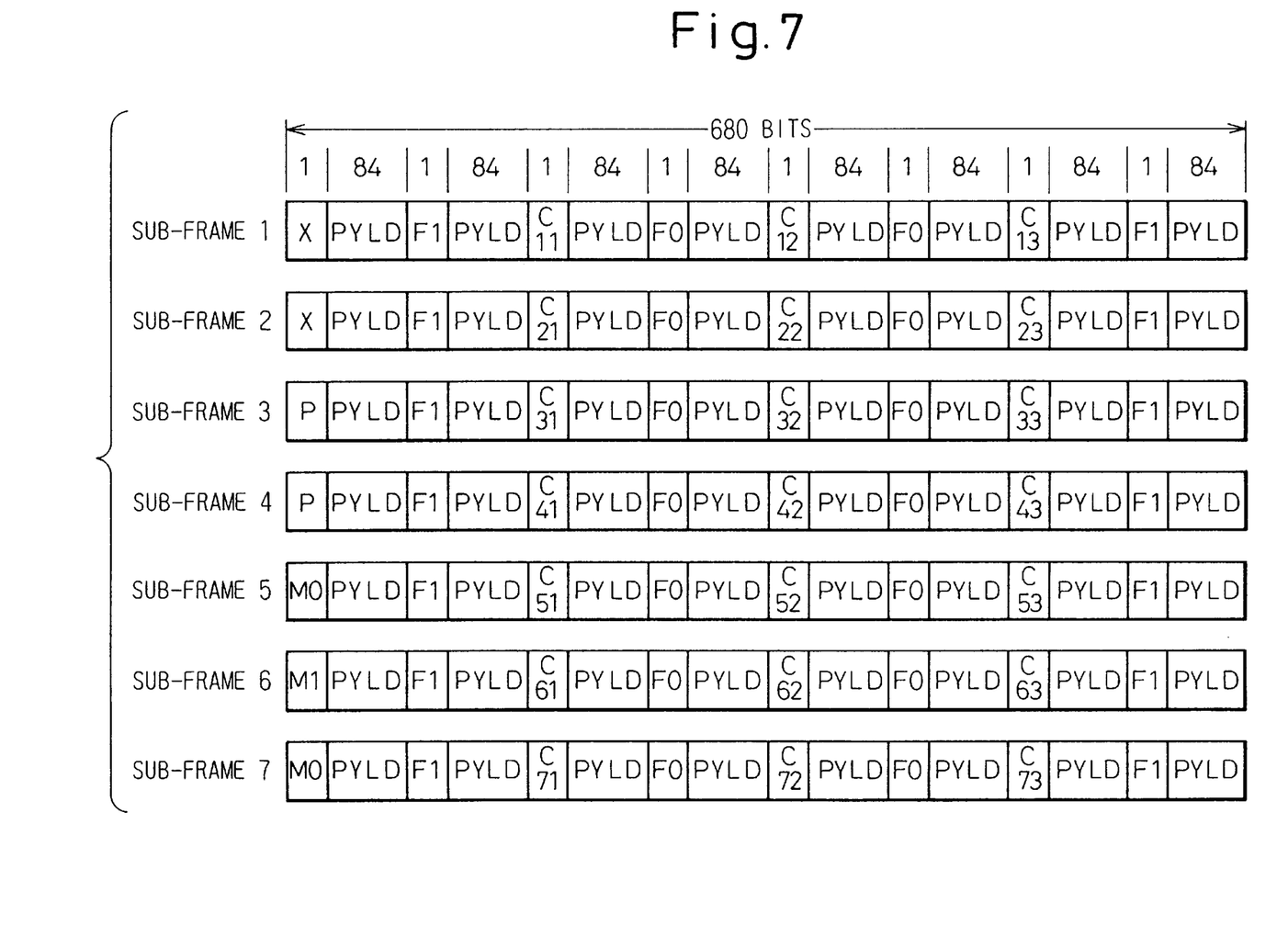
FIG. 7 is a drawing which shows the DS3 C bit parity format.

<1> The method of using the yellow alarm FIG. 7 show the DS3 C bit parity format.

As shown in this drawing, one multi-frame comprises seven sub-frames, and one sub-frame further comprises eight blocks of 85 bits. The first bit of the 85 bits is a DS3 overhead bit, and the remaining 84 bits are the payload (PYLD) of data to be transmitted. In the DS3 interface, at a clock rate of 44.736 MHz, a multi-frame is transmitted with a period of 106.4 μs.

In FIG. 7, X represents a yellow alarm, two bits of which are included in each multi-frame, these being 1 in the normal condition and 0 in the abnormal condition. M0 and M1 are the multi-frame frame synchronization signals, F0 and F1 are the sub-frame frame synchronization signals, and P is a parity bit. C11 to C13, C21 to C23, C31 to C33, C41 to C43, C51 to C53, C61 to C63, and C71 to C73 are control bits (C bits), of these C13 being the FEAC bit.

In the format which is shown in FIG. 7, the yellow alarms, which are defined as the X bits, have the function of transmitting to the far end red alarms which indicate the occurrence of signal dropout or loss of frame synchronization at the receiving side of the local apparatus.

In the method of the present invention, because a red alarm occurs at the receiving apparatus until the value of n reaches a value which matches the actual distance, there should be a yellow alarm sent from the receiving apparatus, so that ultimately when the value of n reachs a value that matches the actual distance, it B/U conversion begins, the DS3 frame being recognized, so that the red alarm is cleared at the receiving apparatus, thereby causing clearing of the yellow alarm, which is a remote alarm, as well.

The interval for changing the value of n is a time interval sufficient for the receiving apparatus to clear the red alarm, thereby stopping the sending of the yellow alarm. Therefore, when the automatic LBO adjustment function starts, with a yellow alarm occurring at first, the value of n when the yellow alarm is then cleared can be recognized as the value of n which matches the actual distance between the transmitting apparatus and receiving apparatus.

<2> The method of using FEAC

Of the C bits in the frame format shown in FIG. 7, of the FEAC code defined as C13, there is a loopback specification at the opposing apparatus for loopback to the sending apparatus, this being used as a communication channel between DS3 terminals. There are the following two methods of using this.

(1) Alarm and status information (2) DS3 loopback specification and clearing

Figure 8:
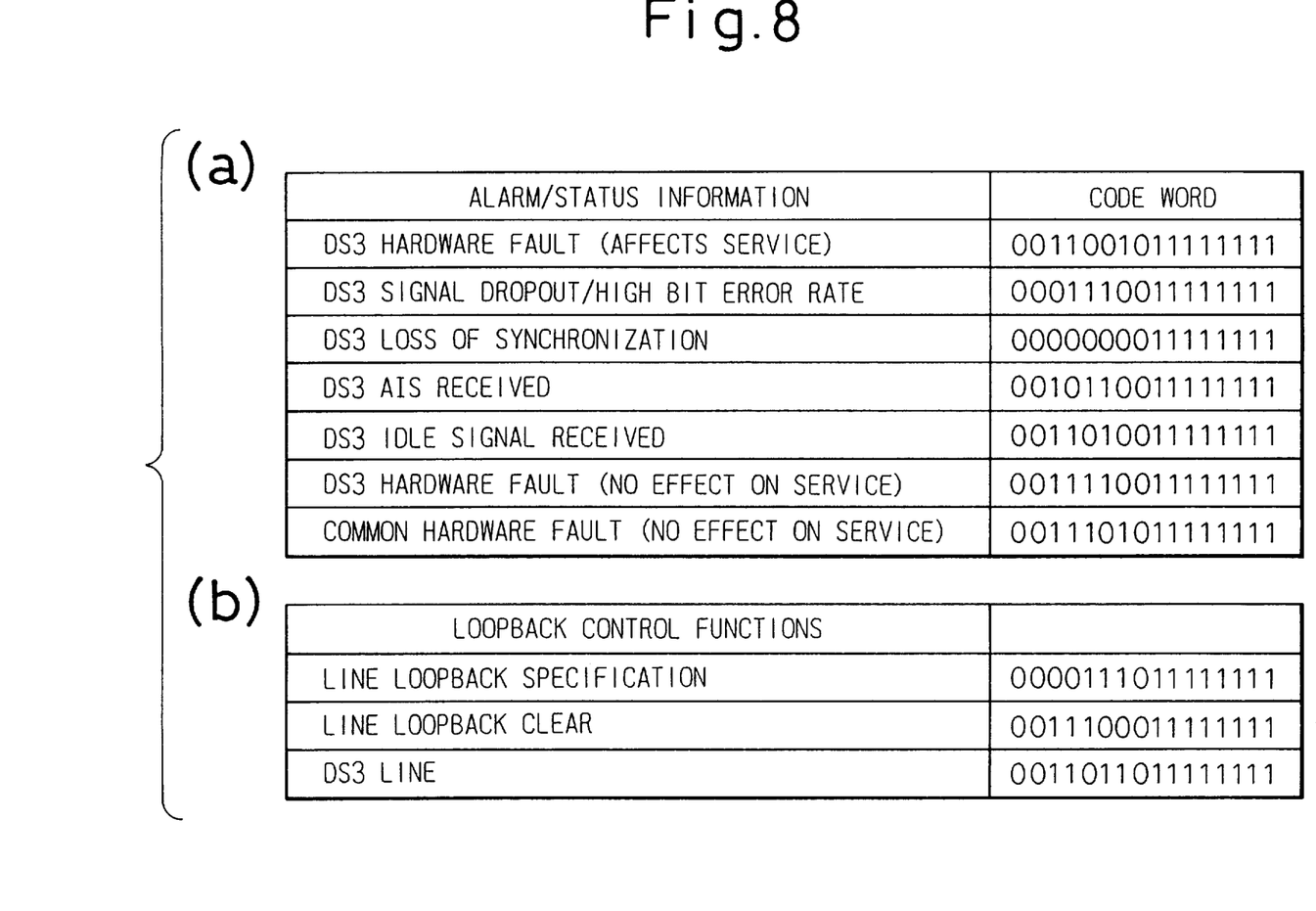
FIG. 8 is a drawing which shows an FEAC code word, with (a) in FIG. 8 showing the alarm and status conditions, and (b) in FIG. 8 showing the loop-back control function.

The FEAC signal is formed as a 16-bit code word by repeating the C13 bit. FIG. 8 shows the FEAC code words, with (a) showing alarms and status conditions and (b) showing loopback control functions.

When the automatic LBO adjustment function is started, the FEAC bits are sent to issue a loopback specification. In the method of the present invention, the loopback specification is recognized at the opposing apparatus when the value of n matches the actual distance, at which time the input signal at the opposing apparatus is looped-back.

To enable recognition by the transmitting apparatus that the looped-back signal is the signal it itself sent, this condition must be inserted into the DS3 frame payload as a recognizable special code. When the special code is recognized by the transmitting apparatus, the value of n at that time can be taken to be the value of n which matches the correct distance. In this case as well as in the case described in method <1>, the interval for changing the value of n is set as a time interval sufficient for the receiving apparatus to operate.

[3] After the transmitting apparatus in this manner recognizes the correct n value and changes the LBO setting to that setting corresponding to that n value, the usual output signal is transmitted. While this function is operating, of course, data cannot be passed at the transmitting apparatus.

Figure 9:
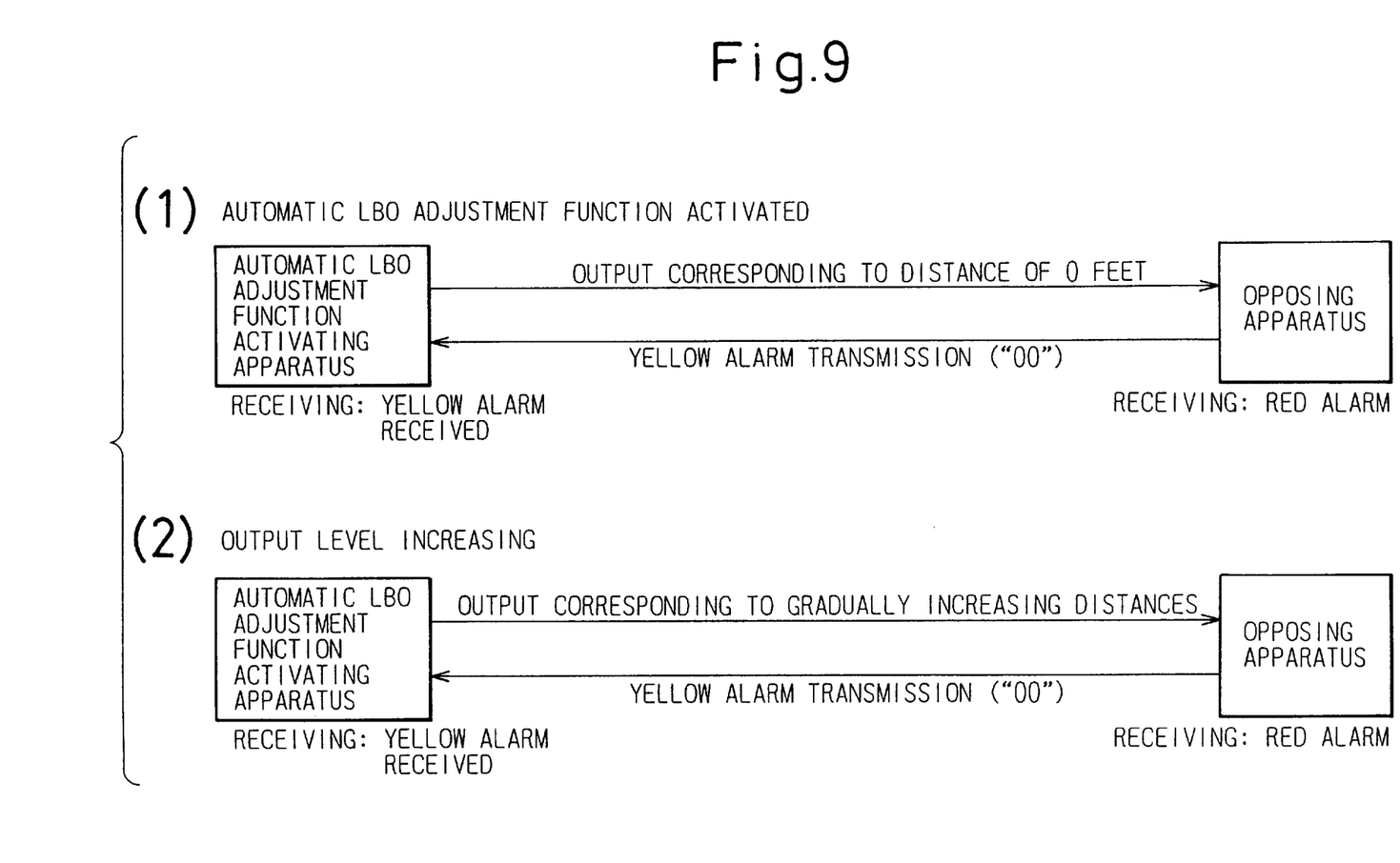
FIG. 9 is a drawing which shows the first sequence in the present invention.
Figure 10:
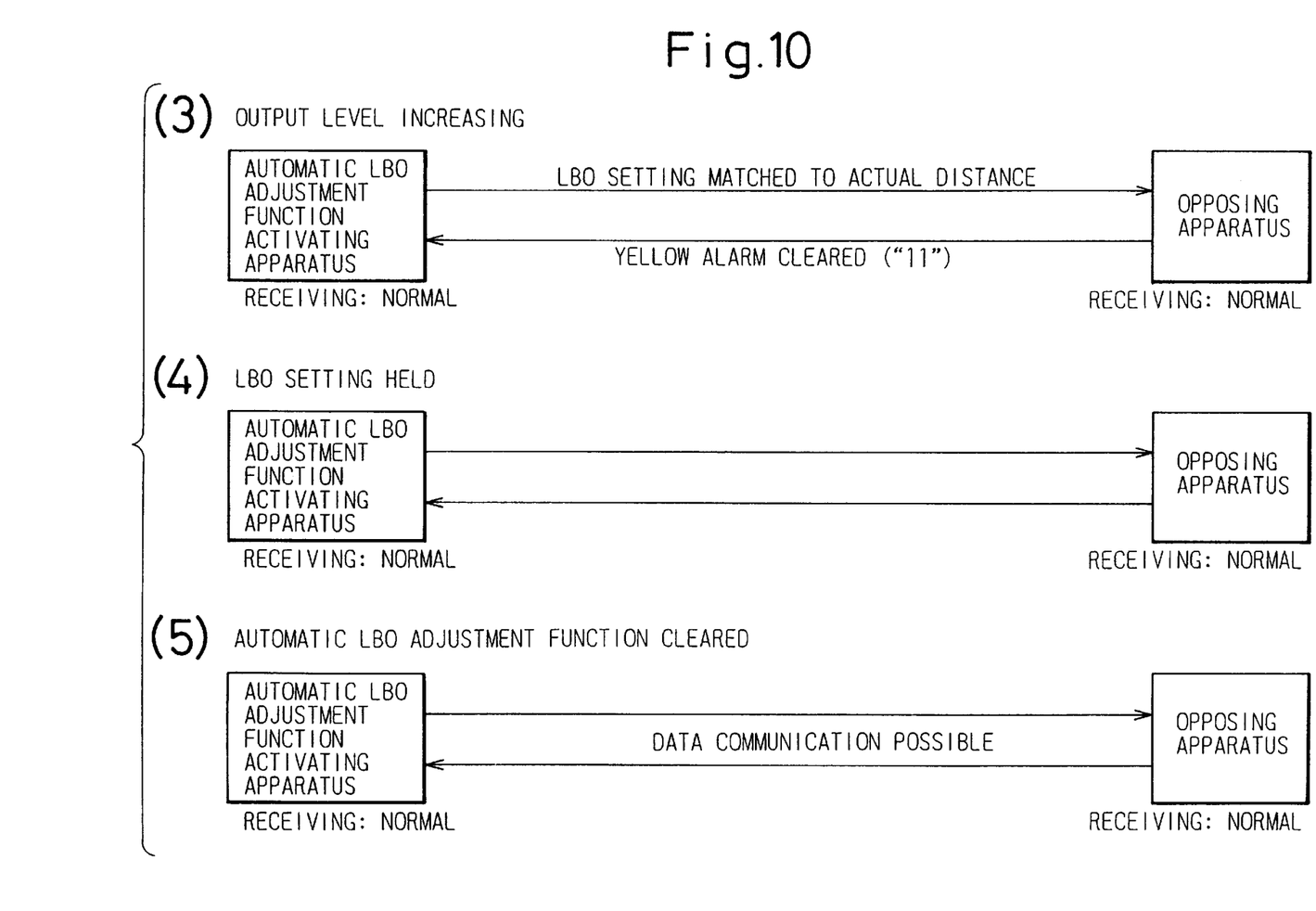
FIG. 10 is a drawing which shows the continuation of the first sequence in the present invention.

FIG. 9 and FIG. 10 show the first sequence in the present invention, which illustrates the case of performing automatic LBO adjustment using the yellow alarm.

The condition indicated at (1) is that in which the automatic LBO adjustment function has been activated, at which point output for a distance of 0 feet is made from the apparatus that has activated the adjustment function, thereby causing a red alarm at the receiving part of the opposing apparatus, a yellow alarm being sent therefrom, the receiving part of the apparatus which has activated the automatic LBO adjustment function receiving this yellow alarm.

At (2) is shown the condition in which output level from the apparatus that has activated the automatic LBO adjustment function is increased, the LBO setting being changed in the direction of gradually increasing distances. In this condition, the red alarm is still set at the opposing apparatus, the yellow alarm being sent therefrom, this being received at the apparatus which has activated the automatic LBO adjustment function.

At (3) is shown the condition in which, as a result of increasing the output level at the apparatus which activated the automatic LBO adjustment function, the LBO setting is adjusted to match the actual distance, normal receiving being done at the opposing apparatus. The result of this is that the sending of the yellow alarm is cleared and the receiving part of the apparatus that activated the automatic LBO adjustment function performs normal reception.

At (4) is shown the condition in which the LBO setting condition is held at the apparatus that activated the automatic LBO adjustment function, normal reception being done not only at the opposing apparatus, but at the apparatus that activated the automatic LBO adjustment function as well.

At (5) is shown the condition in which the automatic LBO adjustment function is cleared at the apparatus which activated the automatic LBO adjustment function, normal reception being performed not only at the opposing apparatus, but at the apparatus that activated the automatic LBO adjustment function as well, in which condition data communication is possible.

Figure 11:
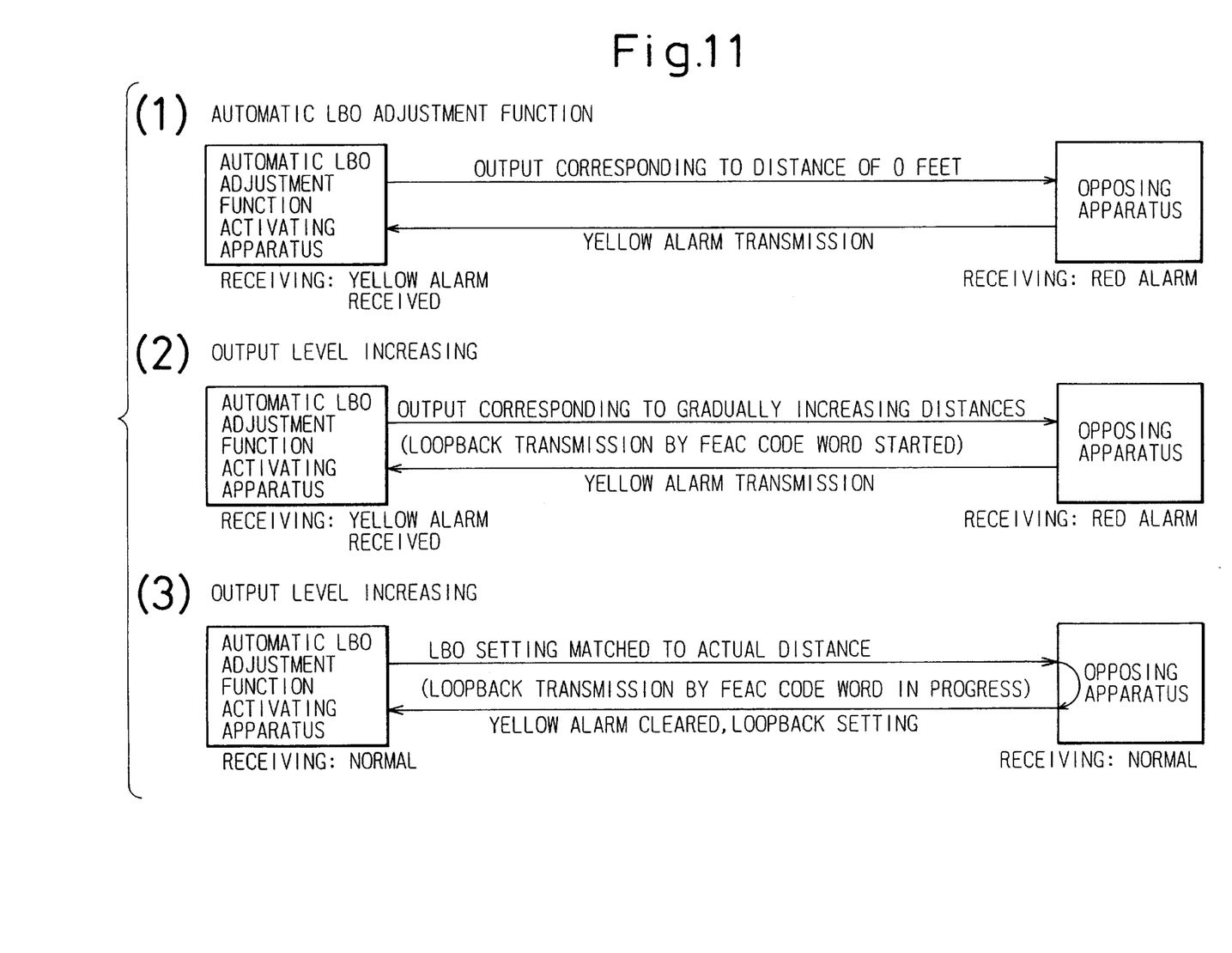
FIG. 11 is a drawing which shows the second sequence in the present invention.
Figure 12:
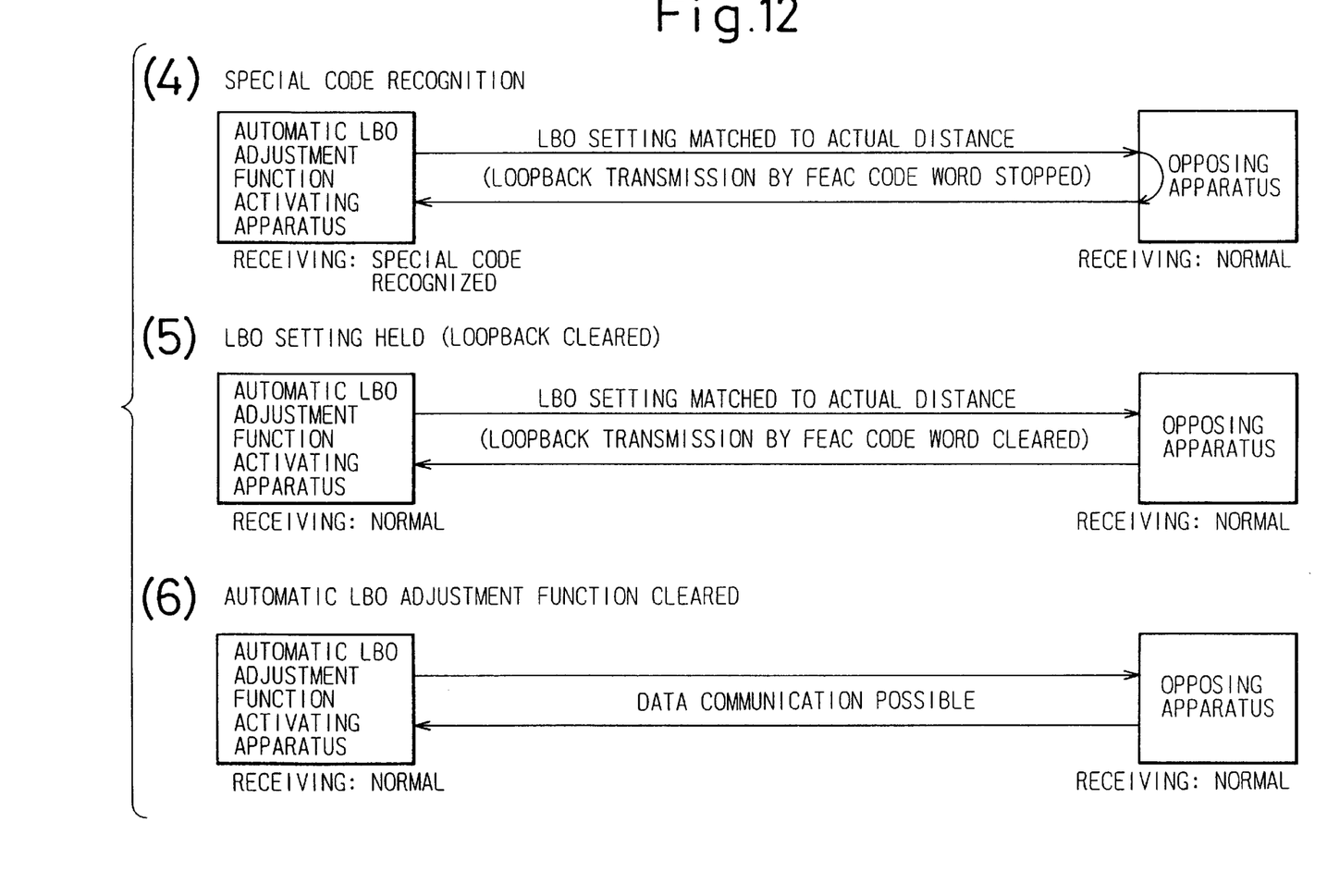
FIG. 12 is a drawing which shows the continuation of the second sequence in the present invention.

FIG. 11 and FIG. 12 show the second sequence in the present invention, which illustrates the case of performing automatic LBO adjustment using the FEAC code word.

The condition indicated at (1) is that in which the automatic LBO adjustment function has been activated, at which point output at a distance of 0 feet is made from the apparatus that has activated the adjustment function, thereby causing a red alarm at the receiving part of the opposing apparatus, a yellow alarm being sent therefrom, the receiving part of the apparatus which has activated the automatic LBO adjustment function receiving this yellow alarm.

At (2) is shown the condition in which output level from the apparatus that has activated the automatic LBO adjustment function is increased, the LBO setting being changed in the direction of gradually increasing distances. In this condition, the red alarm is still set at the opposing apparatus, the yellow alarm being sent therefrom, this being received at the apparatus which has activated the automatic LBO adjustment function. At this time, the loopback specification sending is started by the FEAC code word "0000111011111111" (see FIG. 8).

At (3) is shown the condition in which, as a result of increasing the output level at the apparatus which activated the automatic LBO adjustment function, the LBO setting is adjusted to match the actual distance, normal receiving being done at the opposing apparatus. The result of this is that the sending of the yellow alarm is cleared, the receiving part of the apparatus that activated the automatic LBO adjustment function performing normal reception. At this time the repeated loopback specification sending by means of the FEAC code word is in progress.

At (4) is shown the condition in which the LBO setting is matched to the actual distance at the apparatus that activated the automatic LBO adjustment function, with normal reception being done at the opposing apparatus. At the opposing apparatus the loopback sending by means of the FEAC code word is stopped and when the receiving part of the apparatus that activated the automatic LBO adjustment functions, the special code in a payload of the data accompanying the FEAC code word is recognized. The special code with a specific pattern data, e.g., eye pattern data, bit error pattern data, etc., is used for enabling more accurate adjustment.

At (5) is shown the condition in which the LBO setting condition is held at the apparatus that activated the automatic LBO adjustment function, so that the LBO setting is adjusted to the setting which matches the actual distance, normal reception being done not only at the opposing apparatus. At the opposing apparatus, the loopback sending by means of the FEAC code word is cleared by the reception of a FEAC code word of Line loopback clear "001110001111111" (see FIG. 8). By doing this, the apparatus which activated the automatic LBO adjustment function also performs normal reception.

At (6) is shown the condition in which the automatic LBO adjustment function is cleared at the apparatus which activated the automatic LBO adjustment function, normal reception being performed not only at the opposing apparatus, but at the apparatus that activated the automatic LBO adjustment function as well, in which condition data communication is possible.

While the above description of an embodiment of the present invention was presented for the case of the DS3 interface, the present invention does not impose any such limitation, and can be naturally applied in general to the case of a signal transmitting apparatus which is connected to a far-end apparatus by a transmission path which has relatively high loss.

According to the present invention as described above, in a transmitting apparatus which transmits a signal via a coaxial cable to a receiving apparatus, it is possible to perform automatic adjustment of the output voltage in accordance with the distance to the receiving apparatus, without an effect on the receiving apparatus, and without the necessity of a new function in the receiving apparatus.

What is claimed is:

1. A method of automatically adjusting an output voltage in a transmitting apparatus which transmits a signal via a coaxial cable to a receiving apparatus, comprising the steps of:

making the output level of the signal at said transmitting apparatus a limit level of reception at said receiving apparatus; and automatically adjusting said signal output level of said transmitting apparatus to a signal output level which is in accordance with the length of a coaxial cable between said transmitting apparatus and said receiving apparatus, wherein said automatic adjustment is done by starting the output level at the output level corresponding to a coaxial cable length of zero, and thereafter successively increasing said output level by selecting one of a plurality of the output levels to correspond to greater lengths.

2. An automatic output voltage adjustment method according to claim 1, wherein a judgment of said limit level of reception at said receiving apparatus is performed based on whether or not a bipolar/unipolar conversion of a received signal can be performed at said receiving apparatus.

3. An automatic output voltage adjustment method according to claim 2, wherein notification of the condition of whether or not a bipolar/unipolar conversion is possible at said receiving apparatus is made to said transmitting apparatus by using a yellow alarm in a DS3 frame format.

4. An automatic output voltage adjustment method according to claim 2, further comprising the steps of:

performing a loopback specification from said transmitting apparatus by means of an FEAC code word in a DS3 frame format; and performing loopback of an input signal by said receiving apparatus based on said loopback specification, thereby making notification to said transmitting apparatus that bipolar/unipolar conversion is possible at said receiving apparatus.

5. An automatic output voltage adjustment method according to claim 4, wherein when the input signal is looped-back from said receiving apparatus in accordance with said loopback specification from said transmitting apparatus, a special code is inserted in a payload of the DS3 frame format which is looped-back, the result being recognition by said transmitting apparatus that its output signal has been looped-back.

* * * * *